United States Patent Office 3,404,072
Patented Oct. 1, 1968

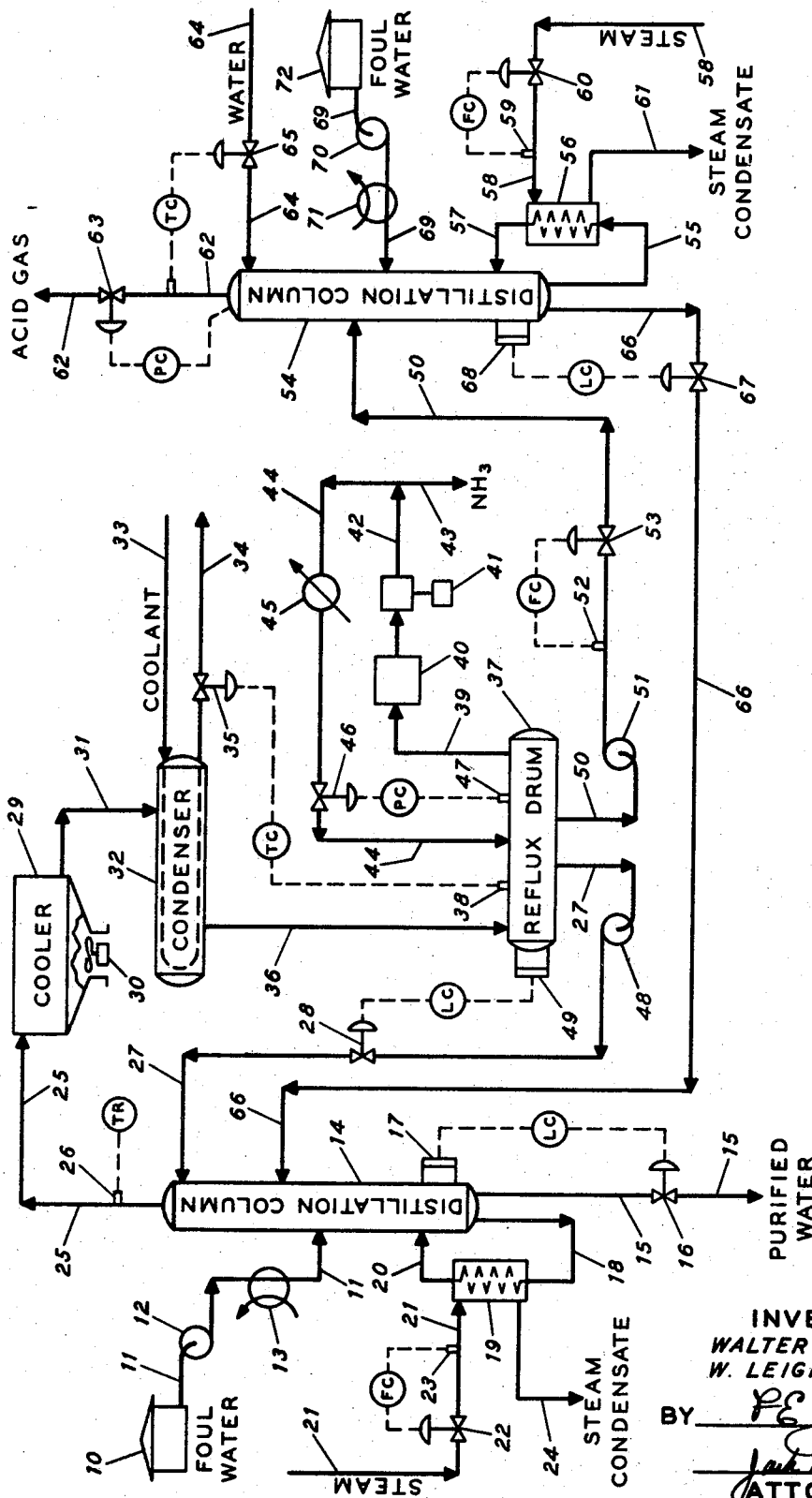

3,404,072
AMMONIA RECOVERY FROM AN ACID GAS IN A PLURAL STAGE, CONTROLLED DISTILLATION SYSTEM
Walter M. Bollen and William L. Short, San Rafael, Calif., assignors to Chevron Research Company, San Francisco, Calif., a corporation of Delaware
Filed Oct. 19, 1966, Ser. No. 587,799
6 Claims. (Cl. 203—1)

ABSTRACT OF THE DISCLOSURE

An improved method is provided for operating a fractionation process wherein an aqueous solution containing ammonia and acid gas is distilled in a distillation column, overhead vapors are partially condensed, a portion of the condensate is returned to the column as reflux, and another portion of the condensate is treated in another distillation column. The overhead vapors are condensed at a controlled constant temperature, the portion of condensate withdrawn for treatment in the other column is withdrawn at a fixed rate, the portion of the condensate returned as reflux is regulated responsive to reflux drum liquid level, and uncondensed vapors comprising purified ammonia are withdrawn from the reflux drum at a rate regulated to maintain a controlled constant pressure.

---

This invention relates to methods and means comprising distillation or fractionation for treating contaminated ammoniacal waters, more particularly for separating ammonia from aqueous ammoniacal solutions containing other contaminants including an acid gas.

In U.S. Patent 3,335,071, filed May 19, 1964, in the names of the applicants herein and another, entitled, "Ammonia Recovery Process," there is disclosed a process for recovering ammonia in high purity and high yield from aqueous solutions of ammonia and hydrogen sulfide. In one embodiment of the process disclosed therein an aqueous ammonium bisulfide solution is first subjected to stripping at superatmospheric pressure to drive off a major portion of the hydrogen sulfide, and the stripped solution from that operation is then stripped in another column referred to as an $NH_3$ stripper to drive $H_2S$ and $NH_3$ overhead together with some water. The vapors from the $NH_3$ stripper are partially condensed, and a portion of the condensate is returned to the $NH_3$ stripper as reflux, another portion being recycled to the $H_2S$ stripper.

In one aspect, the present invention is concerned with improved apparatus and methods which can be used for carrying out such an ammonia stripping operation. The new apparatus and method can be used for separating $NH_3$ of controlled high purity from dilute foul water comprising an aqueous ammoniacal solution containing a contaminating amount of an acid gas which forms a water-soluble salt with $NH_3$. The acid gas may be hydrogen sulfide as disclosed in the aforementioned co-pending application, or it may be carbon dioxide or other acid gas which, as mentioned, forms a water-soluble salt with $NH_3$. The aqueous solution may contain both $H_2S$ and $CO_2$ in addition to $NH_3$, and there may also be present other water-soluble contaminants which do not form salts with $NH_3$ provided these are of low volatility or present in sufficiently low concentrations so as not to contaminate the $NH_3$ vapor product. A volatile contaminant which is easily separated from the $NH_3$ can, however, be tolerated.

The $NH_3$ stripping or distillation column disclosed in the aforementioned U.S. Patent 3,335,071 which is of interest herein is operable at superatmospheric pressure and has an inlet for aqueous solution between the top and bottom thereof, a bottoms liquid outlet, reboiler means for boiling liquid at the bottom to generate upflowing vapors in the column and overhead vapors, and a pressurizable overhead vapor handling system comprising condenser means for cooling overhead vapors to produce condensate, a reflux drum for collecting said condensate and the uncondensed vapors, means for returning condensate as reflux from said drum to said column, and means for withdrawing vapor from said drum. Also, means are provided for withdrawing a non-refluxed portion of condensate from the reflux drum, which portion can be passed to another distillation column wherein acid gas is stripped out, and the condensate stripped of acid gas can be returned to the $NH_3$ stripping column. Thus, this portion of condensate can be considered, and is sometimes referred to herein, as recycle condensate.

In opertaion, $NH_3$ vapors essentially free of $H_2S$ and containing less than 1% water vapor can be obtained from the reflux drum of the $NH_3$ stripper when an appropriate superatmospheric pressure is maintained therein and in the column, if the water content of the overhead vapors from the column is regulated so that at the condensing temperature the ammoniacal condensate formed contains sufficient water to dissolve all the $H_2S$ present in a solution having a higher $NH_3$ concentration but a lower ratio of $NH_3$ to $H_2S$ than the solution fed to the column.

The product $NH_3$ vapor purity or composition and the condensate composition are related according to the reflux drum temperature and pressure. The condensate composition obtained at a particular reflux drum temperature, however, also depends on the composition of the column overhead vapors. If the desired purity of product ammonia vapors is not being obtained, this can be because the column overhead vapors are too wet causing the resulting condensate to be too dilute, or because the overhead vapors are too dry in which case the resulting condensate may not dissolve all of the acid gas present. It will be observed that if the product vapor is to be essentially $NH_3$, for example containing less than 0.1% $H_2S$, an increase to 0.2% $H_2S$ would not necessarily cause or reflect a measurable pressure change. Thus, to recover product $NH_3$ vapors of high purity it was found necessary to provide some means for maintaining the column overhead vapor composition constant, which can be done by maintaining the overhead vapor temperature constant at constant pressure.

Accordingly, in considering ways of operating and controlling the $NH_3$ stripping column where the aqueous feed solution was first stripped in an acid gas stripper and the stripped bottoms passed to the $NH_3$ stripper, one method devised was to regulate the rate of returning condensate to the column as reflux directly responsive to column overhead vapor temperature, to thereby maintain the overhead vapor temperature constant. The condensate in excess of the amount refluxed was withdrawn from the reflux drum, as the so-called recycle condensate passed to the acid gas stripper, at the rate needed to maintain a constant inventory or liquid level of condensate in the reflux drum. This method appeared completely satisfactory at times, but at other times control was erratic and the columns unstable.

According to the present invention a new method of operating and controlling the $NH_3$ stripping column has been devised, which is to set the recycle condensate rate constant, proportional to feed rate, at slightly above the minimum amount estimated or determined to be needed to remove the acid gas fed to the column, and to reflux all condensate in excess of that amount to the column so as to maintain a constant inventory or liquid level of condensate in the reflux drum. This would permit the column overhead vapor temperature to vary, contrary to the need to maintain constant overhead vapor temperature previously described, but it has been discovered that the system tends to be self-compensating if the condensing temperature and pressure are independently held constant. An increase in the overhead vapor temperature at constant pressure must reflect an increase in the water content of the vapors, and it is found that this is accompanied by an increased amount of condensate being formed. Since only a fixed amount of recycle condensate is withdrawn, more must be refluxed to maintain the amount of condensate in the reflux drum constant. The increased flow of reflux condensate at controlled constant temperature tends to lower the overhead vapor temperature, and, in fact, thereby maintains the overhead vapor composition sufficiently constant for control purposes. This method achieves greatly improved stability of operation in both the $NH_3$ stripper column and the acid gas stripper column in spite of variations in composition of the aqueous feed solution, while still maintaining the desired purity of $NH_3$ product vapors.

The apparatus of the present invention comprises, in combination with a distillation column having the features hereinbefore listed for the $NH_3$ stripper: (1) means for determining the temperature of the overhead vapors, (2) means for determining the temperature of the condensate, (3) means for determining the pressure of vapor in the reflux drum, (4) means for determining the amount of condensate in the reflux drum, (5) means controlled responsive to the temperature of said condensate for regulating the cooling achieved in the condenser, (6) means fixing the rate of withdrawing a portion of condensate from said apparatus, (7) means controlled responsive to the amount of condensate in the reflux drum for regulating the rate of returning condensate as reflux, and (8) means controlled responsive to pressure for regulating the rate of withdrawing uncondensed vapor from the reflux drum.

The apparatus will, of course, be provided with control means for carrying out the various above functions. The control means used can be made as simple or as elaborate as desired. Commerically available pneumatically or electrically operated data transmitters and controllers may be used, and the appropriate control set points can be arrived at based on sample analyses, performed periodically in a laboratory or continuously by automated equipment, and calculations by hand, mechanically, or electronically.

When the aqueous solution fed to the column contains $NH_3$ and a smaller contaminating amount of an acid gas which forms a water-soluble salt with ammonia, less than about 1 mol of acid gas per 4 mols of $NH_3$, and the apparatus is operated at superatmospheric pressure and temperature conditions as described hereinafter, the vapor withdrawn from the reflux drum can be $NH_3$ of controlled high purity with respect to acid gas contamination. If the apparatus is used in combination with separate distillation means for receiving the portion of condensate withdrawn from the apparatus, stripping acid gas therefrom, and returning the condensate stripped of acid gas to the column, the aqueous feed solution fed to the column can contain up to equimolar amounts of acid gas and $NH_3$, or even more acid gas than $NH_3$ in some cases. In these latter cases, however, it is necessary that the combination of the aqueous feed solution and the condensate stripped of acid gas provide a gross feed to the column which contains 4 or more mols of $NH_3$ per mol of acid gas. Otherwise, the aqueous feed solution should be subjected to such acid gas stripping first, before passing to the $NH_3$ stripper column.

The attached drawing illustrates schematically the nature and arrangement of apparatus usable in one embodiment of the invention, flow paths of process streams, and the new method of controlling operation of the unit.

Referring now to the drawing, from tank 10 a foul water solution containing ammonia and acid gas is passed by pump 12 through a pipe shown as line 11 into distillation column 14 at a point between the top and bottom thereof, preferably after preheating in heat exchanger 13. The column 14 may comprise any conventional apparatus for countercurrent contacting of liquid and vapor, such as multiple bubblecap distillation trays with liquid downcomers, rain decks, packing such as rashig rings, or sieve trays. From the bottom of column 14 there is provided an outlet conduit for purified water, line 15, and the rate of water withdrawal can be regulated by valve 16 to maintain a level of water in the bottom of the column, as shown by level controller "LC" linking valve 16 and level gage 17. A portion of the bottoms water is diverted via pipe 18 through tubes in reboiler 19, and the vaporized water is returned to the column via pipe 20 to provide the upflowing vapors in the column. The vapors are generated by heating, as for example by steam supplied to the jacket of reboiler 19 via pipe 21 containing control valve 22 regulating the steam flow rate in response to the measurement by orifice 23, as shown by flow controller "FC" linking orifice 23 and valve 22. Steam condensate is withdrawn from the reboiler in conduit 24.

Vapors pass up through the distillation column and overhead through vapor conduit line 25, which contains thermowell 26 with means "TR" for detecting the temperature therein. Liquid reflux is supplied to the top of the column through pipe 27 containing valve 28, the opening and closure of which is regulated as described hereinafter. The overhead vapors in the embodiment illustrated pass to cooler 29, which may comprise multiple finned tubes through which the vapor passes for cooling provided by air blown across the tubes by fan 30. The partially cooled vapors, and any small amount of condensate which may have been formed, pass through conduit 31 to condenser 32. A coolant such as cold water or a refrigerant is supplied to the tubes in condenser 32 via pipe 33, and warm coolant is withdrawn through pipe 34 containing control valve 35. The resulting condensate formed in condenser 32, and uncondensed vapors, pass via conduit 36 to reflux drum 37 wherein they are collected. Drum 37 has a temperature sensing device 38, such as a thermowell, preferably extending into the collected liquid. The temperature detected in the reflux drum at 38 is used to regulate the opening and closing of valve 35, as shown by temperature controller "TC" linking 38 and 35, to thereby adjust the cooling achieved in condenser 32 so as to maintain constant the condensate temperature. In the embodiment illustrated it is assumed that the coolant is water. If a vaporizing refrigerant such as ammonia or Freon were used, the control valve could conveniently be in coolant supply line 33.

Uncondensed vapors are withdrawn from reflux drum 37 through a conduit for vapors shown as line 39. The rate of withdrawing uncondensed vapors from the reflux drum is regulated to maintain a controlled constant pressure therein. In the embodiment illustrated this is done by providing a bypass conduit containing a control valve from the discharge side to the suction side of a compressor or blower working on the vapors. Thus, the $NH_3$ vapors in conduit 39 may be further treated to remove the last traces of acid gas and/or moisture in treating zone 40, for example comprising washing with an alkali solution or contacting with an adsorbent such as charcoal, before entering the suction of compressor 41. From the discharge of compressor 41 the net $NH_3$ product is withdrawn from the compressed vapors of conduit 42 through outlet conduit 43. When and as needed another portion of the vapors in conduit 42 are returned to the suction side of the compressor via conduit 44 containing control valve 46, and cooler 45 to remove the heat of compression. The opening and closure of valve 46 is regulated according to the pressure detected at 47 in drum 37, as shown by "PC" linking pressure pick-up 47 and valve 46, to thereby maintain the reflux drum pressure constant, the valve opening if the pressure tends to fall.

A major portion of the condensate collecting in reflux drum 37 is returned by pump 48 in line 27 as reflux to distillation column 14. The flow rate of reflux condensate through line 27 is regulated by valve 28 directly responsive to the level of liquid in drum 37 detected by level gage 49, as shown by "LC" linking 49 and 28. Another portion of the condensate in reflux drum 37 is withdrawn through pipe 50 containing pump 51, orifice 52, and valve 53. The opening of valve 53 is regulated responsive to fluid flow through orifice 52, by means shown as flow controller "FC" linking valve 53 and orifice 52, so as to maintain a substantially constant flow rate of liquid through line 50.

In the operation of the apparatus as just described, the aqueous feed solution or foul water may be supplied to column 14 through line 11 at the rate at which it becomes available. If, however, this is subject to wide variations, surge capacity may be provided in the nature of feed tank 10. Heat is preferably supplied to boil the solution and provide upflowing and overhead vapors at a substantially constant rate. Thus, the steam supply to reboiler 19 is set at a rate sufficient to handle the highest anticipated feed rate of aqueous solution so that there is always a high vapor traffic in the column and a large amount of reflux. It will be observed that the temperature of the column overhead vapors is in part dependent on the temperature of the reflux condensate being independently regulated and desirably maintained constant. If, for example, the composition of the aqueous feed solution changes in the direction of containing less ammonia and other contaminants, the overhead vapors will tend to contain more water and to be at a higher temperature unless this is counteracted by the flow of reflux being increased to enrich the upper portion of the column in ammonia. In the invention, if the concentration of water in the overhead vapor increases, more reflux is provided relative to overhead vapors because the condensate composition is fixed by the condensing temperature and pressure being constant and, accordingly, a larger fraction of the overhead vapor stream must end up as $NH_3$-rich condensate, and a smaller fraction as uncondensed $NH_3$ vapor. The flow rate of condensate refluxed does not necessarily increase, as the reflux drum liquid level does not necessarily tend to increase, because the volume of overhead vapors might decrease at the same time as the water concentration therein increased.

Controlling overhead temperature directly by reflux rate is quite common in distillation column control, but it will be observed that the present apparatus further differs in that the temperature of the reflux liquid is also independently controlled. This, in conjunction with control of the pressure in the reflux drum, makes possible control of the purity of the $NH_3$ vapor product. In ordinary distillations where it was desired to obtain a vapor product of controlled purity, all of the condensate would be returned to the column as reflux, and the temperature at some point in the column would be controlled as, for example, by regulating the steam input to the reboiler. If this usual technique is used in operating a foul water stripper while attempting to obtain pure ammonia vapors overhead, the ammonia vapor purity is only obtained at the expense of rejecting some ammonia and the acid gas out the bottom of the column. In the present invention the desired ammonia purity is obtained by independently controlling each variable in the overhead system, and rejecting a portion of condensate from the column. In this way, water free of polluting contaminants can be obtained from the bottom of the column.

Referring again to the drawing, the portion of condensate withdrawn from the reflux drum 37 through line 50 is passed to separate distillation means comprising column 54. Column 54, like column 14, comprises conventional distillation apparatus for countercurrent contacting of vapor and liquid. Upflowing vapors are generated by withdrawing a portion of liquid from the bottom through line 55, boiling it in reboiler 56 and returning the vapors through line 57. Heat is supplied by steam to reboiler 56 introduced through line 58 containing control valve 60 operated to maintain a fixed flow rate through orifice 59, as shown by flow controller "FC" linking orifice 59 and valve 60. Steam condensate is withdrawn through line 61. Overhead vapors are withdrawn from the column through line 62 containing valve 63, the opening and closing of which is regulated to maintain a substantially constant superatmospheric pressure in the column, as shown by pressure controller "PC." Water must be introduced into distillation column 54 if the overhead vapors are to be acid gas free of ammonia. Desirably the water is added cold at the top of the column as shown by line 64 containing valve 65. The water rate may be regulated to maintain a constant overhead temperature, as shown by temperature controller "TC" operating valve 65. With a high temperature at the bottom of column 54 and a low temperature at the top of the column, the acid gases will be vaporized and carried overhead while ammonia will be washed out of the upflowing vapors and carried out the bottom of column 54. In some cases fresh water may be supplied via line 64, but it is also possible to recycle a portion of the purified water in line 16 from the bottom of column 14 to column 54. Also, additional cooling means may be provided in the upper portion of column 54, which additional cooling may be regulated as the means of controlling overhead temperature. By operating column 54 at a superatmospheric pressure of 20–400 p.s.i.g., preferably 100–300 p.s.i.g., a high molar ratio of ammonia to acid gas of above 4:1 can be obtained in the solution at the column bottom. Thus, from the bottom of column 54 there is withdrawn an aqueous ammoniacal solution in line 66 containing valve 67, the opening and closure of which is regulated to maintain a level of liquid in the column as indicated by "LC" linking valve 67 and level gage 68. The material in line 66 comprises the withdrawn portion of condensate stripped of acid gas, plus additional water. This stripped condensate is returned to column 14 via line 66.

If the foul water aqueous feed solution in line 11 contains substantially more ammonia than acid gas, at least about 4 mols of ammonia per mol of acid gas, column 14 can be operated to produce essentially pure ammonia vapors in line 43 without the use of column 54. Thus, the ammonia concentration in the overhead system can be built up by imposing a high pressure set point so that control valve 46 remains open until the concentration of ammonia in reflux drum 37 has built up sufficiently at the controlled low temperature such that the vapor therein is essentially ammonia. If the aqueous feed solution contains only slightly more ammonia than acid gas, the pressure in the reflux drum will not build up sufficiently to close valve 46. If the pressure at which valve 46 closes is lowered, it will be found that the ammonia vapors are contaminated with substantial amounts of acid gas. By withdrawing a portion of the condensate from drum 37, diluting it with water and stripping off acid gas in separate distillation equipment, and returning the stripped condensate to the column, the concentration of ammonia in the overhead system can be built up to the point where the vapors of line 43 are essentially pure $NH_3$, if the overhead vapor temperature and condensing temperature are properly controlled.

The embodiment of the invention wherein two columns are used and the foul water feed solution is first treated in an $NH_3$ stripper, is particularly useful in treating dilute aqueous solutions containing less than about 2 mol percent $NH_3$, and especially solutions containing less than 1 mol percent $NH_3$, regardless of whether the solution contains substantially more $NH_3$ than acid gas or only about the same amount or less ammonia as compared to acid gas. This is because column 54, which would operate only on the portion of reflux condensate withdrawn through line 50 and the diluting water added through line 64, can be made substantially smaller than it would have to be if it were used to treat the entire aqueous feed stream to first strip off acid gas to obtain a high ratio of ammonia to acid gas in the feed to column 14. The return of stripped condensate from column 54 to column 14 via line 66 provides the desirable high ratio of ammonia to acid gas in the upper portion of column 14 without the entire feed having to be first stripped of acid gas. The gross feed to column 14, comprising feed and stripped condensate from column 54, must however contain more $NH_3$ than acid gas in a mol ratio of 4 to 1 or higher.

If the foul water to be treated for recovery of ammonia contains above about 2 weight percent $NH_3$ and only one or two mols of $NH_3$ per mol of acid gas, acid gas is preferably first stripped from the water to provide a higher ratio of $NH_3$ to acid gas in the solution fed to the $NH_3$ stripper. For example, in the drawing, such a foul water stream in tank 72 is passed by pump 70 through pipe 69 and preheater 71 into column 54 between the top and bottom thereof. Thus there are the possibilities of passing net foul water feed to column 54 only from tank 72 or to column 14 only from tank 10; of passing a foul water feed of one composition to column 14 while simultaneously passing another foul water feed of different composition to column 54; and of splitting a single feed into two separate portions and passing one portion to column 14 and the other portion to column 54.

The apparatus and method of the present invention has been tried out in a large scale unit and found to be far superior in providing stable, trouble-free performance, uniform product quality, and requiring very little operator attention as compared to the apparatus and method previously used wherein the temperature of overhead vapors of the $NH_3$ stripper was controlled by regulating the reflux condensate rate and excess condensate was passed to the $H_2S$ stripper on reflux drum level control. Even though in the previous operation the flow of excess condensate to the $H_2S$ stripper was small compared to the total feed to that column (the aqueous feed solution also being fed to the $H_2S$ stripper), and variations in flow rate were not large, apparently the condensate was sufficiently concentrated in $NH_3$ and $H_2S$ that even small changes in flow rate could not be tolerated. From time to time, for unexplained reasons, upset conditions arose when the $H_2S$ stripper pressure cycled wildly, and control of the $NH_3$ stripping and recovery column was lost resulting in the production of off-test $NH_3$. These problems were eliminated by the new control scheme for the $NH_3$ stripper.

In operating the $NH_3$ stripper in accordance with the present invention it is important to maintain a steady pressure, within ± about 2 p.s.i., preferably within ±1 p.s.i. or less, and a steady condensing temperature within ± about 2° F., preferably within ±1° F., and the maintaining of steady conditions is more important than the selection of the particular condensing temperature and pressure to be used, within limits. Thus, a change from one set of temperature and pressure conditions to another set should be made or permitted to occur only slowly, for example at a rate less than 2° F. temperature change per hour.

The temperature of the column overhead vapors is an important variable to note and keep track of, particularly during startup, and the fixed rate at which recycle condensate is withdrawn from the reflux drum is intimately related to the overhead vapor temperature. Desirably the overhead vapor temperature is from 60 to 200° F. higher than the condensing temperature, and a higher overhead vapor temperature favors higher purity $NH_3$ but calls for a higher recycle condensate rate. For each operable set of conditions it will generally be found that there is a minimum recycle condensate rate needed, but the recycle condensate rate can be in a range substantially above the minimum needed without greatly benefitting $NH_3$ product purity. It is desirable for economy of operation to use the minimum recycle condensate rate consistent with obtaining the desired $NH_3$ purity. This provides a greater reflux condensate rate, making for easier control of the overhead vapor composition, which is the function of the reflux drum-level-controlled reflux.

It can be seen that within the concepts of the invention the reflux condensate rate could be regulated directly responsive to overhead vapor temperature to thereby maintain the overhead vapor composition constant, and the recycle condensate could still be withdrawn at a fixed rate. The amount of condensate inventory in the reflux drum would then tend to increase or decrease as changes occurred in the feed composition or column operations. Appropriate corrective action to prevent overflowing the reflux drum or draining it empty would be to reset the temperature control point for the overhead vapor. Thus, the reflux rate would in fact be being regulated responsive to reflux drum liquid inventory, to hold the liquid level within bounds, and letting the overhead vapor temperature change albeit with what may be a long cycle time.

The apparatus of the present invention rapidly pays for the cost of installing and operating it when used to recover salable $NH_3$ and $H_2S$ from foul refinery waters obtained by water scrubbing hydrocarbon conversion reaction effluent streams containing substantial amounts of these byproducts, if present in the water in reasonable concentrations of about 1 mol percent and above. For treating more dilute streams, the invention makes possible defraying at least part of the cost by producing salable products while producing clean, nonpolluting water without discharging noxious gases into the atmosphere as occurs in previously-used foul water stripping operations yielding mixtures of $NH_3$ and $H_2S$ which are then incinerated. The following presents a material balance and corresponding typical operating conditions for an embodiment as illustrated in the drawing, for a case where the aqueous feed is quite dilute such that feeding it directly to the $NH_3$ stripper becomes advantageous.

| Stream | Line No. | Composition, wt. percent | | | Flow rate, lbs./time | Conditions | |
|---|---|---|---|---|---|---|---|
| | | $H_2O$ | $NH_3$ | $H_2S$ | | Temp., °F | Press., p.s.i.g. |
| Feed | 11 | 98.5 | 0.5 | 1.0 | 1,000 | | |
| Water product | 15 | 100 | [1] <300 | [1] <100 | 1,475 | 307 | 50 |
| Overhead vapors | 25 | 33 | 51 | 16 | 375 | 240 | 50 |
| $NH_3$ vapors | 43 | 0.2 | 99.7 | 0.1 | 4.9 | 95 | 50 |
| Condensate, reflux | 27 | 33.3 | 50 | 16.7 | 250 | 100 | 50 |
| Condensate, withdrawn | 50 | 33.3 | 50 | 16.7 | 120 | 100 | 50 |
| $H_2S$ vapors | 62 | 0.1 | [1] 100 | 99.9 | 9.9 | 100 | 180 |
| Water added | 64 | 100 | | | 490 | 90 | 180 |
| Recycle bottoms | 66 | 88.3 | 10 | 1.7 | 600 | 320 | 180 |

[1] P.p.m.

Essentially pure $H_2S$ can also be obtained overhead from the acid gas stripping column at 180 p.s.i.g. if only sufficient water is added into the column so that the bottoms water returned to the $NH_3$ stripping and recovery column contains about 20 weight percent $NH_3$.

The same apparatus, though with somewhat modified operating conditions, will also be found useful in treating a variety of other foul water streams produced in a variety of industrial technologies. As examples, there may be mentioned waste ammonical liquors produced in the coal industry as an adjunct to coking operations, Bate liquors and lime liquors produced in the leather treating industries, waters containing decomposition products of anaerobic treatment of sewage and industrial wastes, and various waste streams produced in such industries as textiles and paper, iron and steeel, rubber, sulfur mining, and in purifying hydrogen produced by partial oxidation of hydrocarbon oils. Typical contaminants which may be present in such streams in addition to ammonia include $H_2S$, $CO_2$, HCN, thiosulfates, thiocyanates, phenols, calcium salts, protein matter, sodium sulfide, and hydrocarbons to name but a few. The presence of such contaminants alters the vapor pressure of ammonia over the aqueous solutions in a manner which can become too complex for advance determination, particularly if there are several contaminants present. The control method and means used in the present invention makes possible determining the deviations from ideal behavior caused by such contaminants, during operation of the unit, whereby suitable operating conditions can be arrived at by incremental adjustment of the temperatures and pressure.

Based on data for treating aqueous solutions of $NH_3$ and $H_2S$, the following are ranges of operating conditions which will be found usable in treating similar solutions containing $CO_2$ and/or other contaminants, including preferred ranges at which desirable combinations of low investment and operating cost with high purity product $NH_3$ are to be expected.

|  | $NH_3$ recovery column | | Acid gas stripping column | |
|---|---|---|---|---|
|  | Broad range | Preferred | Broad range | Preferred |
| Pressure, p.s.i.g. | 0–150 | 50–80 | 0–350 | 100–180 |
| Overhead vapor temp., °F | 180–320 | 240–260 | 50–120 | 80–100 |
| Condensing temp., °F | 60–175 | 90–150 |  |  |
| Bottoms temp., °F | 212–370 | 300–320 | 200–400 | 300–340 |

In many cases it will be desirable to make material balance determinations for control purposes, so that flow indicators and sampling points will be provided in the various streams of the unit. In this respect, it will be noted that the drawing is schematic only.

Further, numerous changes and modifications could be made without departing from the spirit and scope of the invention. For example, the provision of cooler 29 ahead of condenser 32 is entirely optional and nonessential, though by reducing the condenser duty it helps make temperature control easier. The overhead vapor temperature can be measured in the top of column 14 or at any point in the vapor line before cooling. Condensing temperature can be measured anywhere between the condenser and return to the column, and the pressure can be determined at any suitable point in the overhead vapor handling system. Control of the $NH_3$ vapor withdrawal rate may be directly in the vapor line off the reflux drum, but since the $NH_3$ vapors are usually compressed and condensed for storage as a liquid, the rate of taking vapors from the reflux drum is conveniently controlled by a bypass line and valve from the compressor discharge to suction. While the bypass $NH_3$ vapors may be returned to the reflux drum as in the embodiment illustrated in the drawing, it is neither essential nor desirable to achieve intimate contact of the vapors with the condensate in the drum.

Other possible modifications will be apparent to those skilled in the art from the descriptions herein, and all such modifications as fall within the scope of the appended claims are intended to be embraced thereby.

We claim:

1. In a fractionation process comprising distilling an aqueous solution containing ammonia and acid gas in a ratio of at least 4 mols of ammonia per mol of acid gas in a distillation column, partially condensing overhead vapors from the distillation column and collecting the resulting condensate and uncondensed vapors in a reflux drum, returning a portion of the condensate as reflux to the column, withdrawing uncondensed vapors comprising high purity ammonia from the reflux drum, and withdrawing another portion of condensate from the reflux drum for treatment in another distillation column, the improved method of operation which comprises condensing said overhead vapors at a controlled constant temperature, withdrawing said another portion of condensate for treatment in another column at a fixed rate, returning the remaining portion of condensate as reflux to the column at a rate regulated responsive to reflux drum liquid level to maintain said level substantially constant, and withdrawing uncondensed vapors from said reflux drum at a rate regulated to maintain a controlled constant column pressure.

2. Process for recovering high purity $NH_3$ vapors from an aqueous stream contaminated with ammonia and acid gas, which comprises continuously feeding said stream to an $NH_3$ stripping column between the top and bottom thereof, generating upflowing and overhead vapors by heaating at a controlled constant bottoms heat input rate, partially condensing overhead vapors at a controlled constant temperature, collecting the condensate and uncondensed vapors in a reflux drum, withdrawing reflux drum vapors at a rate regulated to maintain a controlled constant column pressure, withdrawing a minor portion of the condensate at a fixed rate, returning the remaining portion of the condensate as reflux liquid to the column at a rate regulated directly responsive to reflux drum liquid level to maintain said level substantially constant, passing the withdrawn portion of condensate to another column between the top and bottom thereof, feeding water essentially free of $NH_3$ and acid gas to said another column at a point nearer the top, and in said another column generating upflowing and overhead vapors by heating at the bottom, cooling upflowing vapors near the top, withdrawing overhead acid gas vapors at a rate regulated to maintain a controlled constant column pressure, and withdrawing bottoms water; passing said bottoms water to said $NH_3$ stripping column between the top and bottom thereof, and withdrawing water essentially free of $NH_3$ and acid gas from the bottom of said $NH_3$ stripping column, whereby the vapors withdrawn from said reflux drum comprise high purity $NH_3$.

3. Process according to claim 2 wherein said aqueous stream fed to the $NH_3$ stripping column contains not more than about 2 weight percent $NH_3$.

4. Process according to claim 2 wherein said aqueous stream fed to the $NH_3$ stripping column contains more $NH_3$ than acid gas in a molar ratio above 4:1.

5. Process according to claim 2 wherein an aqueous stream contaminated with $NH_3$ and acid gas in a molar ratio of $NH_3$ to acid gas below 4:1 is continuously fed to said another column.

6. Process according to claim 5 wherein said aqueous stream fed to the $NH_3$ stripping column consists essentially of said bottoms water withdrawn from said another column.

References Cited

UNITED STATES PATENTS

| 2,106,734 | 2/1938 | Gollmar | 23—193 |
| 2,519,451 | 8/1950 | Fulton | 203—75 |
| 3,002,818 | 10/1961 | Berger | 196—132 |
| 3,054,726 | 9/1962 | Fields et al. | 23—193 |
| 3,208,230 | 9/1965 | Fourroux | 62—37 |
| 3,272,722 | 9/1966 | Walker | 203—2 |
| 3,321,380 | 5/1967 | Hillburn | 203—2 |
| 3,322,650 | 5/1967 | Hillburn | 203—1 |

WILBUR L. BASCOMB, JR., *Primary Examiner.*